(No Model.)

J. E. GALLUP.
PLANTER ATTACHMENT FOR DISK HARROWS.

No. 482,632. Patented Sept. 13, 1892.

Witnesses
Wm. S. Hodges
C. Shaw

Inventor
Jasper E. Gallup,
By his Attorney
Patrick O'Farrell.

UNITED STATES PATENT OFFICE.

JASPER E. GALLUP, OF MELLETTE, SOUTH DAKOTA, ASSIGNOR OF ONE-HALF TO BURNHAM W. COLE, OF SAME PLACE.

PLANTER ATTACHMENT FOR DISK HARROWS.

SPECIFICATION forming part of Letters Patent No. 482,632, dated September 13, 1892.

Application filed March 18, 1892. Serial No. 425,420. (No model.)

*To all whom it may concern:*

Be it known that I, JASPER E. GALLUP, a citizen of the United States of America, residing at Mellette, in the county of Spink and State of South Dakota, have invented certain new and useful Improvements in Planter Attachments for Disk Harrows, of which the following is a specification, reference being had therein to the accompanying drawings.

This invention relates to a planter attachment for disk harrows, and has for its object the production of new and improved means whereby seed may be readily and easily planted either in rows or broadcast, as may be desired.

The invention consists in providing a disk harrow with a seed-box, depending arms adjustably secured thereto, a series of plates removably secured on said depending arms, feed tubes or chutes leading from said seed-box and supported by said depending arms, and means for feeding the grain to said chutes.

The invention also comprises the detail of construction, combination, and arrangement of parts substantially as hereinafter fully set forth, and particularly pointed out in the claims.

Figure 1:
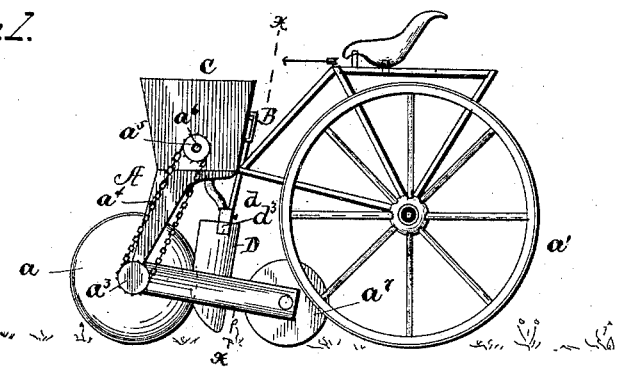
Figure 2:
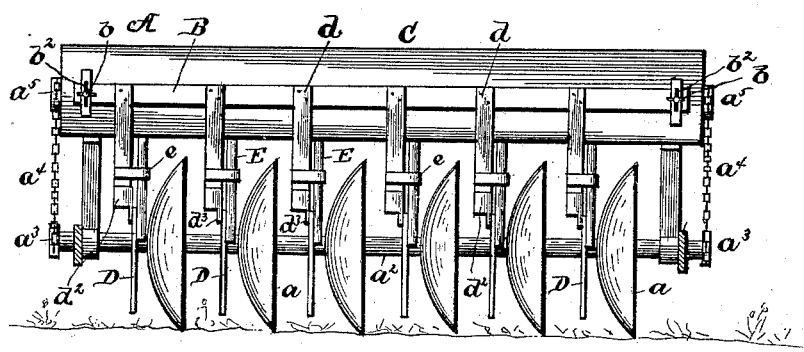
Figure 3:
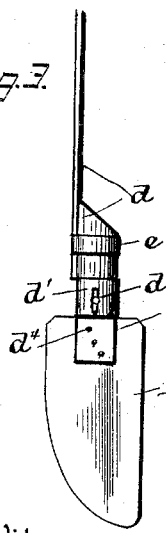
Figure 4:
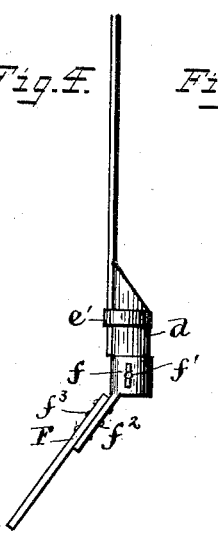
Figure 5:
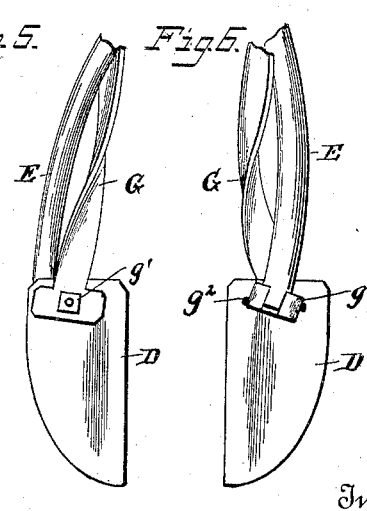
Figure 6:
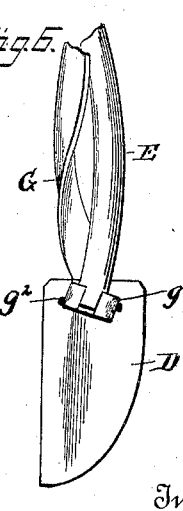

In the accompanying drawings, Figure 1 is a side elevation of a disk harrow with my improvements applied thereto. Fig. 2 is a transverse sectional view on the line $x\ x$, Fig. 1, looking in the direction of the arrow. Figs. 3 and 4 are details. Figs. 5 and 6 are opposite side views of a modification.

Referring to the drawings, A designates a disk harrow having the disks $a$ and main carrying-wheels $a'$, as ordinarily constructed. To one end of the shaft $a^2$ of the disks is secured a sprocket-wheel $a^3$, connected by a sprocket-chain $a^4$ to a second sprocket-wheel $a^5$, secured on a shaft $a^6$ of the seed-box. This chain is designed to operate the feeding mechanism. Suitable rollers $a^7$ follow in the path of each disk and are designed to cover the grain when sown.

B is a plate adjustably secured to seed-box C by set-screws $b$, passed through said plate and working in slots $b^2$ in brackets of said seed-box.

D represents a series of flat metal plates rigidly connected to plates B by suitable arms $d$, depending therefrom. These arms $d$ are connected to plates D by means of set-screws $d'$, working in suitable collars $d^2$, which latter have lower depending flanges $d^3$, rigidly secured to said plates D by rivets or bolts $d^4$. It will be seen that by means of the set-screws $d'$ these plates D may be readily and easily removed from or attached to said arms $d$.

E designates a series of feed tubes or chutes communicating at their upper ends with seed-box C, and the same are passed through and supported by rings or collars $e$ of the depending arms $d$. It will be seen that as the grain is fed from the feed tubes or chutes it will strike against plates D, which will deflect it to the grooves or burrows made by the disks, and thus the grain is planted in rows.

In Fig. 4 I have shown a plate F, which is designed to be used when it is desired to sow broadcast. This plate is removably secured to the depending arms $d$ by a set-screw $f$, working in a collar $f'$, having a lower flange $f^2$, to which flange the plate is secured by rivets or bolts $f^3$. The feed tubes or chutes are conducted down in front of the plate (which latter is inclined forward) by means of a suitable ring or collar. It will readily be seen that when the grain leaves the feed tubes or chutes it will strike against the plate F and be deflected broadcast. It will also be seen that the plates D and F can readily and easily be interchanged, when desired, by merely loosening the set-screws in the securing-collars of each.

My invention is extremely simple, cheap, and durable, and it will be seen that the same can readily be applied to any disk harrow now in use.

In Figs. 5 and 6 I have illustrated a modification of my invention. In lieu of the depending arms $d$ a flat arm or plate G is secured to plate B, and the same is bent or twisted, so as to present the plate D broadside to the disks. This plate G is enlarged at its lower end to form additional bearing-surface for the plate D. The feed-tube E is secured by means of a collar $g$, adjustably secured by a nutted bolt $g'$, projected through a slot $g^2$. From this it will be seen that the plate D may be adjusted with relation to the disk and is secured by but a single bolt.

I claim as my invention—

1. In a planter attachment for disk harrows, the seed-box, the depending arms adjustably secured to said seed-box, the plates removably secured to said depending arms, and the feed tubes or chutes leading from said seed-box and supported by said depending arms, and means for feeding the grain to said tubes or chutes, substantially as set forth.

2. The herein-described planter attachment for disk harrows, comprising the seed-box, the adjustable plate secured thereto, the depending arms secured to said adjustable plate, the guide-plates removably secured to said arms, the feed tubes or chutes leading from said seed-box, the rings or collars secured to said depending arms and designed to support said feed tubes or chutes, and means for feeding the grain to said feed tubes or chutes, substantially as set forth.

3. The herein-described improved planter attachment for disk harrows, consisting of the metal plate for guiding the grain, the ring or collar having a lower flange to which said plate is secured, a supporting-arm inserted in said ring or collar, and the set-screw for securing the same thereto, substantially as set forth.

4. The herein-described improved planter attachment for disk harrows, comprising the combination of the seed-box, the adjustable plate secured thereto, the depending arms secured to said adjustable plate, the rings or collars secured to said depending arms and having lower flanges, the guide-plates secured to said flanges, the feed tubes or chutes leading from the seed-box, the rings or collars secured to said depending arms and designed to support said feed tubes or chutes, and means for feeding the grain to the feed tubes or chutes, substantially as set forth.

In testimony whereof I affix my signature in presence of two witnesses.

JASPER E. GALLUP.

Witnesses:
F. S. McElherne,
L. J. Volmer.